United States Patent [19]

van Pottelsberghe de la Potterie

[11] 3,716,379

[45] Feb. 13, 1973

[54] PREPARATION OF BEEF AND CHICKEN FLAVORING AGENTS

[75] Inventor: Pierre Joseph van Pottelsberghe de la Potterie, Columbus, Ohio

[73] Assignee: Societe D'Assistance Technique pour Produits Nestle SA, Lausanne, Switzerland

[22] Filed: Oct. 6, 1970

[21] Appl. No.: 78,590

[52] U.S. Cl. ................................................99/140 N
[51] Int. Cl. ................................................A23l 1/26
[58] Field of Search ........................99/140 R, 140 N

[56] References Cited

UNITED STATES PATENTS

| | | | |
|---|---|---|---|
| 3,394,016 | 7/1968 | Bidmead et al. | 99/140 |
| 3,394,017 | 7/1968 | Giacino | 99/140 |
| 3,480,447 | 11/1969 | Hack et al. | 99/140 |
| 3,493,395 | 2/1970 | Soeters | 99/140 |
| 3,532,515 | 10/1970 | Broderick et al. | 99/140 |

Primary Examiner—Morris O. Wolk
Assistant Examiner—Warren Bovee
Attorney—Watson, Leavenworth & Kelton

[57] ABSTRACT

Meat flavoring agents are obtained by reacting a plant protein hydrolysate with thiamine and a mono or polysaccharide, the hydrolysate containing no cystine or cysteine.

12 Claims, No Drawings

PREPARATION OF BEEF AND CHICKEN FLAVORING AGENTS

This invention is concerned with flavoring substances having the taste and aroma of cooked meat.

It is generally believed that the development of the basic meaty flavor common to all meat is produced by non-enzymatic browning of the precursors present in the water-soluble fractions of fresh meat.

Various materials having the flavor and aroma of roasted meats are described in the literature, and the preparation of these substances is essentially based on the Maillard reaction which takes place when amino acids or proteinaceous substances are heated in the presence of mono or polysaccharides. The heating causes browning of the reactants accompanied by the development of aromatic components.

A particular role in meat flavor development has been described to cystine, cysteine or peptides containing these amino acids.

The present invention is based on the observation that superior flavoring materials may be obtained by reacting a plant protein hydrolysate with thiamine and a mono or polysaccharide, the hydrolysate containing no cystine or cysteine. The reaction product has excellent keeping quality and its flavor and aroma resemble cooked meat more closely than products prepared from starting materials including cystine or cysteine or flavoring agents obtained in the absence of a saccharide. By varying the amount and type of mono or polysaccharide different flavor profiles may be obtained, ranging from a boiled to a roasted flavor of chicken or beef.

The protein hydrolysate may be partially or completely hydrolysed to amino acids. Thus, the hydrolysate may contain free amino acids as well as other substances derived from proteins, such as polypeptides. Such hydrolysates may be obtained by acid hydrolysis of an animal, vegetable or fish protein, and generally contain 25 to 35 percent of amino acids. Preferred are vegetable protein hydrolysates obtained by hydrolysis with hydrochloric acid of proteinaceous materials such as wheat germ, corn gluten, soy protein, peanut press cake, linseed protein and the like. Mixtures of proteins may also be used, and the hydrolysates are advantageously used in partially-neutralized form.

Thiamine may be used in the reaction either as the free base or as an acid addition salt with, for example, a hydrohalide acid such as hydrochloric acid.

Among the various monosaccharides which may be used, preferred are pentoses such as ribose, xylose or arabinose, or hexoses such as glucose. Xylose is particularly preferred, and it may be used in different amounts, depending on the desired flavor profile. Low concentrations provide chicken flavors, whereas higher concentrations give flavors similar to roast beef.

Instead, or together with, a monosaccharide such as xylose, a mixture of mono and polysaccharides as present in autolysed yeast may be used, with a corresponding reduction in the quantity of pentose or hexose. Thus, for example, when about 15 parts by weight of yeast are used, the xylose may be reduced to about 0.2 parts. The addition of autolysed yeast furthermore has a favorable effect on the flavor of the reaction product, as it provides an improved mouthfeel. The yeast may also be added to the product after reaction.

The quantities of the reactants will depend on the flavor profile desired, but in general will lie within the following approximate ranges:

| | | |
|---|---|---|
| Hydrolysate | 20–50 | parts by weight |
| Saccharide | 0.2–4.0 | parts by weight |
| Thiamine | 0.5–3.0 | parts by weight |
| Yeast (may be added after reaction) | 5–25 | parts by weight |

The reaction is carried out in an aqueous medium, preferably under reflux at the boiling temperature of the mixture. The reaction time will generally be between 1 and 3 hours. The amount of water present in the medium may be one to three times the weight of the total solids present.

In addition to the principal reactants described above, one or more 5'-nucleotides, such as sodium inosinate or sodium guanylate, may also be added to the reactants, in quantities between 0.3 and 1.5 parts by weight. Alternatively, the nucleotides may be added to the product after reaction.

The flavoring agent may be provided in liquid, paste or dry form, the reaction medium being concentrated and/or dried by conventional methods. No separate isolation step is necessary, the reaction product being water-soluble. It has a strong meat flavor.

The invention is illustrated by the following examples, in which the parts are by weight.

EXAMPLE 1

3 chicken flavors are prepared by refluxing (at about 95° C.) the following ingredients for about 1½ hours:

| | A | B | C |
|---|---|---|---|
| Vegetable protein hydrolysate* | 37.17 | 34.07 | 37.17 |
| Autolysed yeast extract | 14.80 | 18.24 | 14.80 |
| Nucleotides** | 0.48 | 0.48 | 0.48 |
| Xylose | 0.19 | 0.18 | 1.19 |
| Thiamine HCl | 1.11 | 1.10 | 1.81 |
| Water | 46.25 | 45.93 | 44.55 |

*Cysteine-free, prepared from corn gluten
**50/50 mixture of sodium inosinate and sodium guanylate.

Upon completion of the reaction, the mixture is concentrated and dried.

EXAMPLE 2

The following ingredients are refluxed for 1½ hours:

| | |
|---|---|
| Vegetable protein hydrolysate* | 24.6 parts |
| Autolysed yeast extract | 7.38 |
| Thiamine HCl | 0.74 |
| Nucleotides** | 0.49 |
| Water | 66.42 |

*Prepared from a 70/30 mixture of corn gluten and wheat germ
**50/50 mixture of sodium inosinate and sodium guanylate.

Upon completion of the reaction, the mixture is concentrated under vacuum and dried. The resulting dry powder has an excellent chicken flavor.

EXAMPLE 3

A beef flavor is obtained by refluxing the following ingredients for 2 hours:

| | |
|---|---|
| Vegetable protein hydrolysate* | 24.0 parts |
| Autolysed yeast extract | 7.0 |
| Nucleotides** | 1.0 |

| | |
|---|---|
| Xylose | 1.25 |
| Thiamine HCl 1.25 parts | |
| Water | 65.50 |

*Prepared from a 70/30 mixture of corn gluten and wheat germ
**50/50 mixture of sodium inosinate and sodium guanylate.

After drying a powder having excellent beef flavor is obtained. The flavoring may also be provided as a paste by concentrating the mixture after the reaction.

EXAMPLE 4

2 chicken flavors are prepared by refluxing the following ingredients at about 95° C. for 2 hours:

| | A | B |
|---|---|---|
| Corn gluten hydrolysate | 37.92 | 45.17 parts |
| Xylose | 0.19 | 0.5 |
| Thiamine HCl | 1.14 | 1.5 |
| Nucleotides* | 0.75 | — |
| Water | 60.00 | 52.00 |

*50/50 mixture of sodium inosinate and sodium guanylate.

After drying, 16.31 parts of autolysed yeast extract are added to formula A. The product of formula B is dry blended with 19.43 parts of autolysed yeast and 0.83 parts of nucleotides. All products have a very pleasant chicken flavor

I claim:

1. A water-soluble beef or chicken flavoring agent produced by a process which comprises reacting together, by heating in aqueous medium, a mixture comprising about 20 to 50 parts by weight of vegetable protein hydrolysate essentially free of cystine and cysteine, about 0.3 to 4.0 parts by weight of a saccharide and about 0.5 to 3.0 parts by weight of thiamine or an acid addition salt thereof, the amount of water present in the medium being about one to three times the total weight of solids.

2. A product according to claim 1 in which the mixture also contains about 0.3 to 1.5 parts by weight of one or more 5'-nucleotides.

3. A product according to claim 1 in which the saccharide is xylose.

4. A product according to claim 1 in which upon completion of the reaction the medium is concentrated to provide the flavoring agent in paste form.

5. A product according to claim 1 in which upon completion of the reaction the flavoring agent is recovered in powdered form by removing the water from the medium.

6. A product according to claim 1 in which the protein hydrolysate contains 25 to 35 percent by weight of amino acids.

7. A water-soluble beef or chicken flavoring agent produced by a process which comprises reacting together, by heating in aqueous medium, a mixture comprising about 20 to 50 parts by weight of vegetable protein hydrolysate essentially free of cystine and cysteine, about 0.2 to 4.0 parts by weight of a saccharide, about 0.5 to 3.0 parts by weight of thiamine or an acid addition salt thereof and about 5 to 25 parts by weight of autolysed yeast, the amount of water present in the medium being about 1 to 3 times the total weight of solids.

8. A product according to claim 7 in which the saccharide is xylose.

9. A product according to claim 7 in which the mixture also contains about 0.3 to 1.5 parts by weight of one or more 5'-nucleotides.

10. A product according to claim 7 in which upon completion of the reaction the medium is concentrated to provide the flavoring agent in paste form.

11. A product according to claim 7 in which upon completion of the reaction the flavoring agent is recovered in powdered form by removing the water from the medium.

12. A product according to claim 7 in which the protein hydrolysate contains 25 to 35 percent by weight of amino acids.

* * * * *